United States Patent
Goel (10) Patent No.: US 8,756,482 B2
(45) Date of Patent: Jun. 17, 2014

(54) EFFICIENT ENCODING/DECODING OF A SEQUENCE OF DATA FRAMES

(75) Inventor: Anurag Goel, Panchkula (IN)

(73) Assignee: NVIDIA Corporation, Santa Clara, CA (US)

( * ) Notice: Subject to any disclaimer, the term of this patent is extended or adjusted under 35 U.S.C. 154(b) by 1111 days.

(21) Appl. No.: 11/753,611

(22) Filed: May 25, 2007

(65) Prior Publication Data

US 2008/0294962 A1  Nov. 27, 2008

(51) Int. Cl.
*H03M 13/00* (2006.01)
(52) U.S. Cl.
USPC .............. 714/776; 375/240.01; 375/240.12; 375/240.24
(58) Field of Classification Search
USPC ............ 714/776; 375/240.01, 240.12, 240.24
See application file for complete search history.

(56) References Cited

U.S. PATENT DOCUMENTS

| | | | |
|---|---|---|---|
| 3,679,821 A * | 7/1972 | Schroeder | ................ 375/240.12 |
| 4,177,514 A | 12/1979 | Rupp | |
| 4,583,164 A | 4/1986 | Tolle | |
| 4,591,979 A | 5/1986 | Iwashita | |
| 4,644,461 A | 2/1987 | Jennings | |
| 4,755,810 A | 7/1988 | Knierim | |
| 4,814,978 A | 3/1989 | Dennis | |
| 4,992,857 A | 2/1991 | Williams | |
| 5,045,940 A | 9/1991 | Peters et al. | |
| 5,130,797 A | 7/1992 | Murakami et al. | |
| 5,146,324 A | 9/1992 | Miller et al. | |
| 5,212,742 A | 5/1993 | Normile et al. | |
| 5,225,875 A | 7/1993 | Shapiro et al. | |
| 5,233,689 A | 8/1993 | Rhoden et al. | |
| 5,267,334 A | 11/1993 | Normille et al. | |
| 5,267,344 A | 11/1993 | Nelson, III | |
| 5,369,744 A | 11/1994 | Fukushima et al. | |
| 5,371,896 A | 12/1994 | Gove et al. | |
| 5,596,369 A | 1/1997 | Chau | |
| 5,598,514 A | 1/1997 | Purcell et al. | |
| 5,608,652 A | 3/1997 | Astle | |
| 5,613,146 A | 3/1997 | Gove et al. | |
| 5,623,311 A | 4/1997 | Phillips et al. | |
| 5,630,033 A | 5/1997 | Purcell et al. | |

(Continued)

FOREIGN PATENT DOCUMENTS

| | | |
|---|---|---|
| CN | 1489391 | 4/2004 |
| EP | 1283640 | 2/2003 |

(Continued)

OTHER PUBLICATIONS

Andrew Gibson, "H.264 Video Encoding Standard", year Aug. 2002, pp. 1-98, Queens University Kingston Ontario Canada.

(Continued)

*Primary Examiner* — Sam Rizk (57) ABSTRACT

Encoding data by first performing a transformation of predicted data and input data, and then performing a subtraction of the resulting outputs. In an embodiment, the prediction approach is chosen such that fewer elements of different values (compared to a number of elements in the input data) are generated, and the different values are generated in a predictable position. The transformation approach is chosen such that the output expressly represents variations in the input data as well as satisfies a distributive property. The decoding may be performed based on the same concepts. As a result, the data can be encoded and/or decoded efficiently.

20 Claims, 7 Drawing Sheets

(56) References Cited

U.S. PATENT DOCUMENTS

| | | |
|---|---|---|
| 5,646,692 A | 7/1997 | Bruls |
| 5,657,465 A | 8/1997 | Davidson et al. |
| 5,768,429 A | 6/1998 | Jabbi et al. |
| 5,790,881 A | 8/1998 | Nguyen |
| 5,809,538 A | 9/1998 | Pollmann et al. |
| 5,821,886 A | 10/1998 | Son |
| 5,845,083 A | 12/1998 | Hamadani et al. |
| 5,870,310 A | 2/1999 | Malladi |
| 5,883,823 A | 3/1999 | Ding |
| 5,889,949 A | 3/1999 | Charles |
| 5,898,881 A | 4/1999 | Miura et al. |
| 5,909,224 A | 6/1999 | Fung |
| 5,923,375 A | 7/1999 | Pau |
| 5,954,786 A | 9/1999 | Volkonsky |
| 5,969,728 A | 10/1999 | Dye et al. |
| 5,999,220 A | 12/1999 | Washino |
| 6,035,349 A | 3/2000 | Ha et al. |
| 6,073,185 A | 6/2000 | Meeker |
| 6,088,355 A | 7/2000 | Mills et al. |
| 6,098,174 A | 8/2000 | Baron et al. |
| 6,104,470 A | 8/2000 | Streefkerk et al. |
| 6,144,362 A | 11/2000 | Kawai |
| 6,148,109 A | 11/2000 | Boon et al. |
| 6,157,751 A | 12/2000 | Olson et al. |
| 6,175,594 B1 | 1/2001 | Strasser et al. |
| 6,188,799 B1 | 2/2001 | Tan et al. |
| 6,195,389 B1 | 2/2001 | Rodriguez et al. |
| 6,222,883 B1 | 4/2001 | Murdock et al. |
| 6,269,174 B1 | 7/2001 | Koba et al. |
| 6,272,281 B1 | 8/2001 | De Vos et al. |
| 6,305,021 B1 | 10/2001 | Kim |
| 6,311,204 B1 | 10/2001 | Mills |
| 6,317,124 B2 | 11/2001 | Reynolds |
| 6,356,945 B1 | 3/2002 | Shaw et al. |
| 6,360,234 B2 | 3/2002 | Jain et al. |
| 6,418,166 B1 | 7/2002 | Wu et al. |
| 6,459,738 B1 | 10/2002 | Wu et al. |
| 6,539,060 B1 | 3/2003 | Lee et al. |
| 6,539,120 B1 | 3/2003 | Sita et al. |
| 6,560,629 B1 | 5/2003 | Harris |
| 6,647,062 B2 | 11/2003 | Mackinnon |
| 6,665,346 B1 | 12/2003 | Lee et al. |
| 6,687,788 B2 | 2/2004 | Vorbach et al. |
| 6,690,835 B1 | 2/2004 | Brockmeyer et al. |
| 6,690,836 B2 | 2/2004 | Natarajan et al. |
| 6,708,246 B1 | 3/2004 | Ishihara et al. |
| 6,721,830 B2 | 4/2004 | Vorbach et al. |
| 6,751,721 B1 | 6/2004 | Webb, Jr. et al. |
| 6,760,478 B1 | 7/2004 | Adiletta et al. |
| 6,782,052 B2 | 8/2004 | Sun et al. |
| 6,799,192 B1 | 9/2004 | Handley |
| 6,807,317 B2 | 10/2004 | Mathew et al. |
| 6,823,443 B2 | 11/2004 | Horiyama et al. |
| 6,950,473 B2 | 9/2005 | Kim et al. |
| 6,993,639 B2 | 1/2006 | Schlansker et al. |
| 6,996,645 B1 | 2/2006 | Wiedenman et al. |
| 7,038,687 B2 | 5/2006 | Booth, Jr. et al. |
| 7,095,783 B1 | 8/2006 | Sotheran et al. |
| 7,173,631 B2 | 2/2007 | Anderson |
| 7,260,148 B2 | 8/2007 | Sohm |
| 7,277,101 B2 | 10/2007 | Zeng |
| 7,289,672 B2 | 10/2007 | Sun et al. |
| 7,379,501 B2 | 5/2008 | Lainema |
| 7,394,284 B2 | 7/2008 | Vorbach |
| 7,403,564 B2 | 7/2008 | Laksono |
| 7,450,640 B2 | 11/2008 | Kim et al. |
| 7,499,491 B2 | 3/2009 | Lee et al. |
| 7,548,586 B1 | 6/2009 | Mimar |
| 7,548,596 B2 | 6/2009 | Yen et al. |
| 7,551,671 B2 | 6/2009 | Tyldesley et al. |
| 7,565,077 B2 | 7/2009 | Rai et al. |
| 7,581,076 B2 | 8/2009 | Vorbach |
| 7,581,182 B1 | 8/2009 | Herz |
| 7,630,097 B2 | 12/2009 | Kodama et al. |
| 7,689,000 B2 | 3/2010 | Kazama |
| 7,693,219 B2 | 4/2010 | Yan |
| 7,720,311 B1 | 5/2010 | Sriram |
| 7,721,069 B2 | 5/2010 | Ramchandran et al. |
| 7,924,923 B2 | 4/2011 | Lee et al. |
| 7,996,827 B2 | 8/2011 | Vorbach et al. |
| 8,009,923 B2 | 8/2011 | Li et al. |
| 8,369,402 B2 | 2/2013 | Kobayashi et al. |
| 2001/0020941 A1 | 9/2001 | Reynolds |
| 2001/0024448 A1 | 9/2001 | Takase et al. |
| 2001/0028353 A1 | 10/2001 | Cheng |
| 2001/0028354 A1 | 10/2001 | Cheng et al. |
| 2002/0015445 A1 | 2/2002 | Hashimoto |
| 2002/0015513 A1 | 2/2002 | Ando et al. |
| 2002/0025001 A1 | 2/2002 | Ismaeil et al. |
| 2002/0041626 A1 | 4/2002 | Yoshioka et al. |
| 2002/0109790 A1 | 8/2002 | Mackinnon |
| 2002/0114394 A1 | 8/2002 | Ma |
| 2002/0118743 A1 | 8/2002 | Jiang |
| 2003/0020835 A1 | 1/2003 | Petrescu |
| 2003/0048361 A1 | 3/2003 | Safai |
| 2003/0078952 A1 | 4/2003 | Kim et al. |
| 2003/0141434 A1 | 7/2003 | Ishikawa et al. |
| 2003/0161400 A1 | 8/2003 | Dinerstein et al. |
| 2004/0057523 A1 | 3/2004 | Koto et al. |
| 2004/0095998 A1 | 5/2004 | Luo et al. |
| 2004/0100466 A1 | 5/2004 | Deering |
| 2004/0150841 A1 | 8/2004 | Lieberman et al. |
| 2004/0156435 A1 | 8/2004 | Itoh et al. |
| 2004/0174998 A1 | 9/2004 | Youatt et al. |
| 2004/0181564 A1 | 9/2004 | MacInnis et al. |
| 2004/0181800 A1 | 9/2004 | Rakib et al. |
| 2004/0190613 A1 | 9/2004 | Zhu et al. |
| 2004/0190617 A1 | 9/2004 | Shen et al. |
| 2004/0202245 A1 | 10/2004 | Murakami et al. |
| 2004/0213348 A1 | 10/2004 | Kim et al. |
| 2004/0218626 A1 | 11/2004 | Tyldesley et al. |
| 2004/0218675 A1 | 11/2004 | Kim et al. |
| 2004/0228415 A1 | 11/2004 | Wang |
| 2004/0257434 A1 | 12/2004 | Davis et al. |
| 2004/0268088 A1 | 12/2004 | Lippincott et al. |
| 2005/0008254 A1 | 1/2005 | Ouchi et al. |
| 2005/0033788 A1 | 2/2005 | Handley |
| 2005/0047502 A1 | 3/2005 | McGowan |
| 2005/0066205 A1 | 3/2005 | Holmer |
| 2005/0079914 A1 | 4/2005 | Kaido et al. |
| 2005/0105618 A1 | 5/2005 | Booth et al. |
| 2005/0123040 A1 | 6/2005 | Bjontegard |
| 2005/0190976 A1 | 9/2005 | Todoroki et al. |
| 2005/0238102 A1 | 10/2005 | Lee et al. |
| 2005/0238103 A1 | 10/2005 | Subramaniyan et al. |
| 2005/0265447 A1 | 12/2005 | Park |
| 2005/0265454 A1 | 12/2005 | Muthukrishnan et al. |
| 2005/0276493 A1* | 12/2005 | Xin et al. ............ 382/239 |
| 2005/0281337 A1 | 12/2005 | Kobayashi et al. |
| 2005/0286630 A1 | 12/2005 | Tong et al. |
| 2006/0002466 A1 | 1/2006 | Park |
| 2006/0017802 A1 | 1/2006 | Yoo et al. |
| 2006/0056513 A1 | 3/2006 | Shen et al. |
| 2006/0056708 A1 | 3/2006 | Shen et al. |
| 2006/0109910 A1 | 5/2006 | Nagarajan |
| 2006/0115001 A1 | 6/2006 | Wang et al. |
| 2006/0133501 A1 | 6/2006 | Lee et al. |
| 2006/0133506 A1 | 6/2006 | Dang |
| 2006/0176299 A1 | 8/2006 | Subbalakshmi et al. |
| 2006/0176962 A1 | 8/2006 | Arimura et al. |
| 2006/0203916 A1 | 9/2006 | Chandramouly et al. |
| 2006/0291563 A1 | 12/2006 | Park et al. |
| 2007/0002945 A1 | 1/2007 | Kim |
| 2007/0002950 A1 | 1/2007 | Yang |
| 2007/0036215 A1 | 2/2007 | Pan et al. |
| 2007/0070080 A1 | 3/2007 | Graham et al. |
| 2007/0133689 A1 | 6/2007 | Park et al. |
| 2007/0171981 A1* | 7/2007 | Qi ............ 375/240.24 |
| 2007/0217506 A1 | 9/2007 | Yang et al. |
| 2007/0230564 A1* | 10/2007 | Chen et al. ............ 375/240.01 |
| 2007/0274389 A1 | 11/2007 | Kim et al. |
| 2007/0286284 A1 | 12/2007 | Ito et al. |
| 2007/0286508 A1 | 12/2007 | Le Leannec et al. |
| 2008/0069203 A1 | 3/2008 | Karczewicz et al. |

(56) References Cited

U.S. PATENT DOCUMENTS

| | | | |
|---|---|---|---|
| 2008/0117214 | A1 | 5/2008 | Perani et al. |
| 2008/0137726 | A1* | 6/2008 | Chatterjee et al. ....... 375/240.01 |
| 2008/0151997 | A1 | 6/2008 | Oguz |
| 2008/0285444 | A1 | 11/2008 | Diab et al. |
| 2009/0060277 | A1 | 3/2009 | Zhang et al. |
| 2009/0086827 | A1 | 4/2009 | Wu et al. |
| 2009/0116549 | A1 | 5/2009 | Shen et al. |
| 2009/0122864 | A1 | 5/2009 | Palfner et al. |
| 2009/0161763 | A1 | 6/2009 | Rossignol et al. |
| 2009/0196350 | A1 | 8/2009 | Xiong |
| 2009/0268974 | A1 | 10/2009 | Takagi |
| 2010/0034268 | A1 | 2/2010 | Kusakabe et al. |

FOREIGN PATENT DOCUMENTS

| | | |
|---|---|---|
| GB | 2348559 | 3/1999 |
| JP | 4162893 | 6/1992 |
| JP | 04-162893 | 8/1992 |
| JP | 11096138 | 4/1999 |
| JP | 2001184323 | 7/2001 |
| JP | 2005-192232 | 7/2005 |
| JP | 2005354686 A2 | 12/2005 |
| JP | 2006287315 | 10/2006 |
| WO | 9827742 | 6/1998 |
| WO | 02/33650 | 4/2002 |
| WO | 2005001625 | 6/2003 |
| WO | 2005/096168 | 10/2005 |
| WO | 2006/085137 | 8/2006 |

OTHER PUBLICATIONS

Advanced Video Coding for generic audiovisual services, Telecommunication Standardization Sector of ITU, Dated Mar. 2005, pp. 1-343.

Jamil-Ur-Rehman and Dr. Zhang Ye, "Efficient Techniques for Signalling Intra Prediction modes of H.264/Mpeg-4 Part 10", Proceedings of the First International Conference on Innovative Computing, Information and Control, ICICIC, Year 2006, pp. 1-4.

"Ralf Schafer et al.,", "H.264/AVC", Dated: Jan. 2003, pp. 1-12.

Realization of Low-Bit_Ratio Video Encoder Using Mpact Media Processor; IWASAKI, Junichi et al.; 1997.

3D Graphics Processor for Mobile Set Based on Configurable Processor; TAKEMOTO, Takashi et al.

Tu, C., Liang, J., and Tran, T. "Adaptive Runlength Coding", in_IEEE Signal Processing Letters_ vol. 10, No. 3, pp. 61-64. Mar. 2003.

A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.

Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on, vol. 2, No., pp. 11-273-6 vol. 2, May 23-26, 2004.

Iwasaki, I.; Naganuma, J.; Nitta, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond Hdtv level," Design, Automation and Test in Europe Conference and Exhibition, Mar. 2003.

Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov. 1997.

Shih-Hao Wang et al.; "A platform-based MPEG-4 advanced video coding (AVC) decoder with block level pipelining," Information, Communications and Signal Processing, 2003 and the Fourth Pacific Rim Conference on Multimedia Proceedings of the 2003 Joint Conference of the Fourth International Conference on, vol. 1, No., pp. 51-55 vol. 1, Dec. 2003.

_The Merriam-Webster Dictionary_. 2005 ed. Springfield, MA: Merriam-Webster Inc., 2005.

Chen, Hao et al., "Adaptive FMO Selection Strategy for Error Resilient K264 Coding" International Conference on Audio, Language and Image Processing, 2008. ICALIP 2008, Jul. 7-9, 2008, pp. 868-872.

Hannuksela, Miska et al., "Random Access Using Isolated Regions", IEEE 2003, pp. III-841 to III-844.

Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, JP000439487.

Rohini Krishnan, et al., "Design of a 2D DCT/ICDCT Application Specific VLIW Processor Supporting Scaled and Sub-sampled Blocks," 16th International Conference on VLSI Design, 2003, six pages.

Tourapis et al., Proc. Of SPIE Conf. Vis. Comm. And Img. Processing, vol. 3, pp. 1365-1373, Jun. 2000.

Zheng, et al., Inter. Conf. Info. Systems, Analysis and Synthesis, SCI 2001-ISAS 2001, vol. 13, 2001.

* cited by examiner

| 78 | | | | |
|---|---|---|---|---|
| 78 | | | | |
| 77 | | | | |
| 78 | | | | |
| 78 | 78 | 77 | 78 | 78 |

| 80 | 80 | 80 | 80 |
|---|---|---|---|
| 81 | 80 | 81 | 80 |
| 80 | 80 | 80 | 80 |
| 80 | 79 | 80 | 80 |

FIG. 8C

| 78 |
|---|
| 78 |
| 77 |
| 78 |

FIG. 8D

| 320 | 0 | 0 | 0 |
|---|---|---|---|
| 321 | -1 | -1 | 2 |
| 319 | -2 | -1 | -1 |
| 321 | -1 | -1 | 2 |

FIG. 8E

| 312 |
|---|
| 312 |
| 308 |
| 312 |

FIG. 8F

| 8 | 0 | 0 | 0 |
|---|---|---|---|
| 9 | -1 | -1 | 2 |
| 11 | -2 | -1 | -1 |
| 9 | -1 | -1 | 2 |

FIG. 8G

| 3 | -1 | 1 | 8 |
|---|---|---|---|
| -3 | -2 | 1 | -1 |
| -4 | -3 | 2 | 1 |
| 37 | 4 | -3 | -3 |

FIG. 9

EFFICIENT ENCODING/DECODING OF A SEQUENCE OF DATA FRAMES

BACKGROUND

1. Field of Disclosure

The present disclosure relates generally to digital signal processing, and more specifically to efficient encoding/decoding of a sequence of data frames.

1. Related Art

Encoding generally refers to converting digital values according to an approach (encoding approach) such that the encoded data can be reconverted back to the original digital values within an acceptable error level. The reconversion back is referred to as decoding.

There are several situations in which a sequence of data frames is present. In general, each data frame contains multiple values. For example, a sequence of video frames is generated while capturing images of scenes of interest. Each video frame is viewed as containing multiple pixel values, with each pixel value representing a point/portion of the captured image.

Such data frames are often encoded and then decoded. Encoding is generally performed for representing the data in a compressed format and decoding is performed to recover the original data again. Representation in compressed format can have advantages such as requiring reduced storage space, reduced transmission requirements, etc.

There is a general need to perform such encoding and/or decoding while reducing one or more of resources such as computations, memory, power, etc.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention performs a transformation of the digital values in each of a sequence of frames, applies the same transformation to a predicted data, and then performs a difference of the results of the two transformations.

In an embodiment, the prediction approach is chosen such that fewer elements of different values are generated, and the different values are generated in a predictable position. The transformation approach is chosen such that the output expressly represents variations in the input data as well as satisfies a distributive property, i.e., $T(A+B)=T(A)+T(B)$, wherein T represents transformation operation, A and B represent the respective input sets of data.

As a result, the data can be encoded efficiently. The decoding can also be based on a similar principle, but with the inverse of the transformation approach. In an embodiment the techniques are used to encode and decode (in general code) a sequence of video frames.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. EXAMPLE ENVIRONMENT

Figure 1:
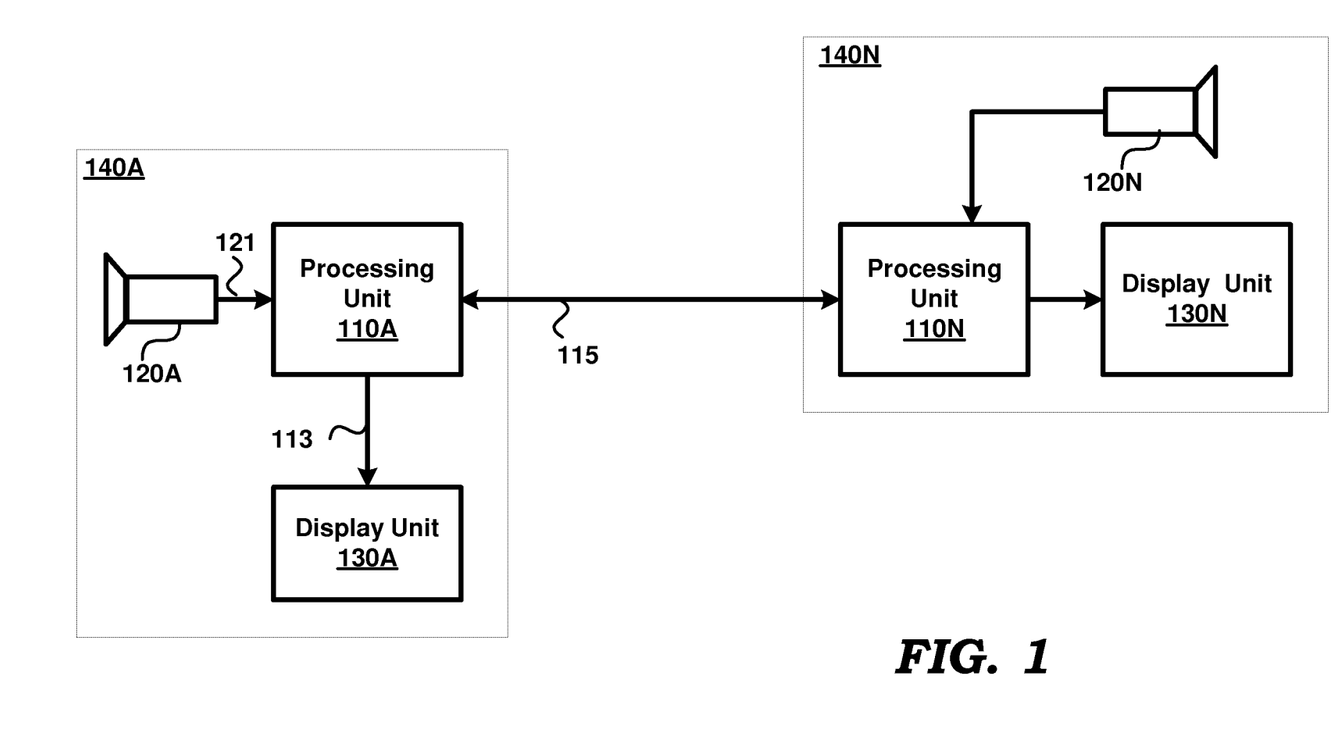
FIG. 1 is a block diagram of an example environment in which several aspects of the present invention may be implemented.

FIG. 1 is a diagram illustrating an example environment in which several features of the present invention may be implemented. The example environment is shown containing only representative systems for illustration. However, real-world environments may contain many more systems/components as will be apparent to one skilled in the relevant arts. Implementations in such environments are also contemplated to be within the scope and spirit of various aspects of the present invention.

The diagram is shown containing end systems 140A and 140N designed/configured to communicate with each other in a video conferencing application. End system 140A is shown containing processing unit 110A, video camera 120A and display unit 130A, and end system 140N is shown containing processing unit 110N, video camera 120N and display unit 130N.

End systems 140A through 140N represent example systems implemented according to several aspects of the present invention. Processing unit 110N, video camera 120N and display unit 130N respectively operate similar to the corresponding components of end system 140A, and the description is not repeated for conciseness. Each component of end system 140A is described in detail below.

Video camera 120A captures images of a scene, and forwards the captured image (in the form of corresponding video frames) to processing unit 110A on path 121. Each video frame may be represented by a number of pixel elements (digital values), with each pixel element having a color value for a point/portion of the captured image.

Processing unit 110A encodes the pixel elements and generates encoded data. The encoded data is transmitted on transmission path 115. Processing unit 110A may similarly receive encoded data on transmission path 115 from end system 140N. Processing unit 110A decodes the received data and sends the decoded frames for display on display unit 130A.

Both processing units 110A and 110N may thus need to perform both encoding and decoding of data. Merely for ease of description, it is assumed that processing unit 110A encodes data and processing unit 110N decodes the data in the description below.

It may be appreciated that it is desirable to reduce the various resource requirements in the processing units for encoding/decoding operations. Several aspects of the present invention enable such an objective to be met as described below in further detail with examples.

The features may be appreciated in comparison with a prior approach processing a sequence of video frames. Accordingly such a prior approach is described first.

3. EXAMPLE PRIOR ENCODING/DECODING APPROACH

Figure 2A:
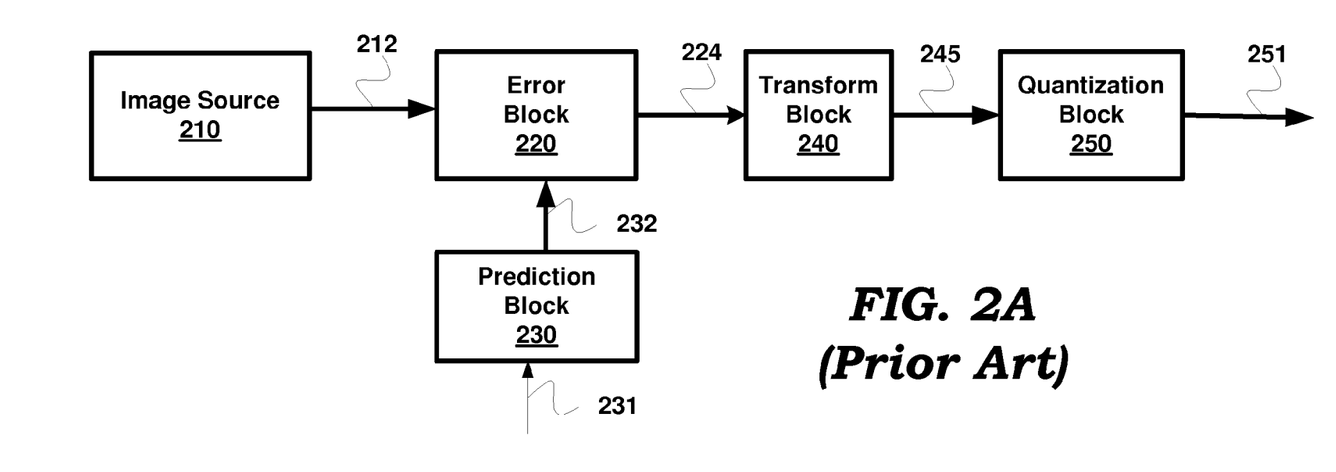
FIG. 2A is a block diagram illustrating a encoding approach in one prior embodiment.
Figure 2B:
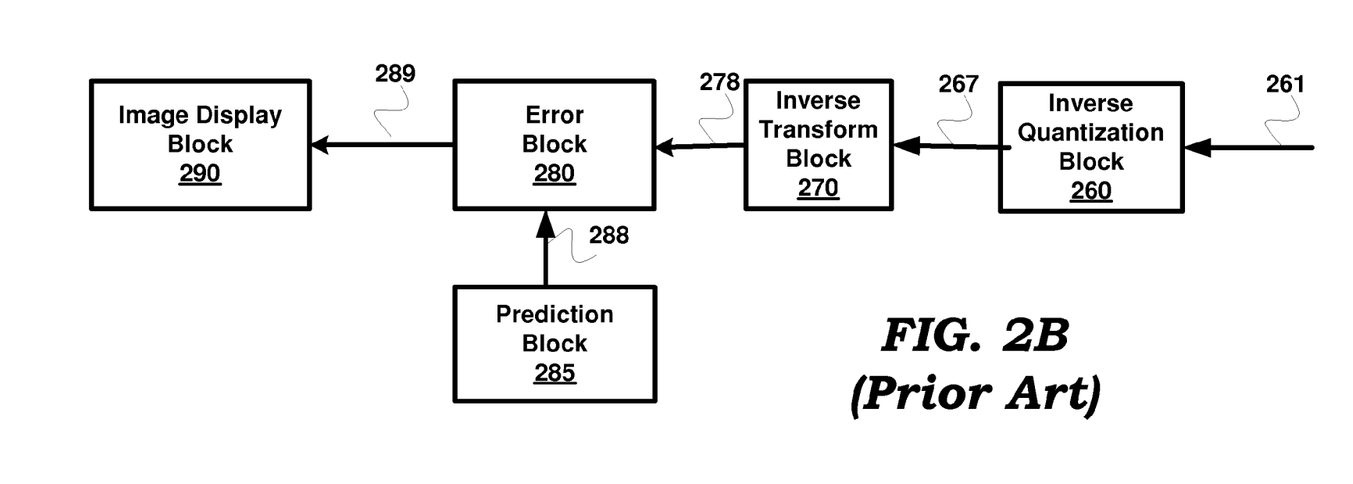
FIG. 2B is a block diagram illustrating a decoding approach in one prior embodiment.

FIG. 2A is a block diagram illustrating a prior encoding approach and FIG. 2B illustrates the corresponding decoding approach. FIG. 2A is shown containing image source 210, error block 220, prediction block 230, transform block 240, and quantization block 250. Each block is described below in further detail.

Image source 210 represents a block generating a stream of image frames, with each image frame being represented by a corresponding set of pixel values. Each image frame may be provided in its entirety or as macro-blocks. Each macro-block represents a portion of the image frame. Each macro block may be further divided into micro blocks (4×4/8×8 pixels) and provided for processing. In an embodiment, each macro-block is provided as 16×16 pixels (i.e., 16 pixels in horizontal direction and 16 in vertical direction). In general, each macro-block, micro block or image frame thus provided is hereafter referred to as an original image block, which represents an example of a data frame sought to be encoded.

Prediction block 230 predicts a predicted image block for each original image block according to a pre-specified approach (e.g., intra prediction modes such as horizontal, vertical, mean, etc.). In an embodiment, prediction block 230 receives reconstructed frames on path 231, and the data in the reconstructed frames is used for prediction. Reconstruction may be performed in a known way, for example, as described in the H.264 standard noted below. Prediction may be performed using techniques such as intra prediction, inter prediction or other prediction techniques well known in the relevant arts. Pixel values representing the predicted image block are provided on path 232.

Error block 220 subtracts corresponding pixel values of original image block and predicted image block. A matrix (difference block) representing the difference is provided on path 224. The difference block may contain the same number of elements as in the original image block.

Transformation block 240 transforms the difference block into a compressed block. In general, the transformation is designed such that the compressed block can be represented by a fewer number of bits compared to those in the difference block (and original image block as well).

The transformation may be obtained by performing a mathematical operation on the elements of the difference block. In an embodiment, the transformation corresponds to a discrete cosine transformation (DCT) or integer DCT (which both have the distributive property noted above). Transformation may also correspond to a DCT or integer DCT and followed by a Hadamard transformation as well known in the field of art. For example a 16×16 block may divided into sixteen 4×4 blocks, the DCT may be applied to each 4×4 block. The DC coefficient of each 4×4 block is collected to form a 4×4 DC coefficient block which is then transformed using Hadamard transformation technique.

Quantization block 250 further digitizes (quantizes) the (individual elements of) compressed block to represent the elements of compressed block with a desired number of bits. It may be appreciated that only fewer bits are needed to represent each element due to the compression noted above, and quantization takes advantage of such a property.

The components of the corresponding prior decoding logic are shown in FIG. 2B. Blocks 260, 270 and 280 respectively operate in the inverse of the approaches of blocks 250,240, and 220 as is well known in the relevant arts and the description is not repeated for conciseness. Once the data received on path 261 is recovered with a desired level of accuracy, the recovered data is send on path 289 for display by image display block 290.

From the above, it may be appreciated that various resources may be required for encoding and decoding of a sequence of data frames. Various aspects of the present invention described below reduce the computational, memory and other resource requirements (e.g., power consumption) compared to the prior approach described above.

4. Efficient Encoding Approach

Figure 3:
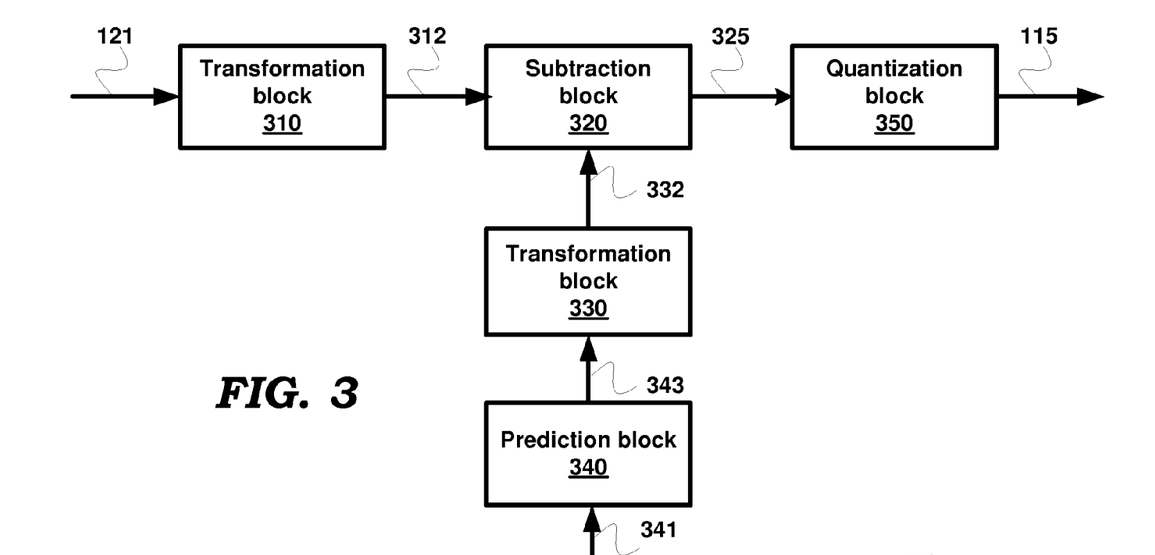
FIG. 3 is a block diagram illustrating an encoding approach in an embodiment of the present invention.

FIG. 3 is a block diagram illustrating the implementation of an encoder in an embodiment of the present invention. The encoder is shown containing transformation blocks 310 and 330, subtraction block 320, prediction block 340, and quantization block 350. Each block is described below in further detail.

Transformation block 310 receives digital values of a original image block (e.g., 16×16 block, 8×8 block or 4×4 block of a video frame noted above) on path 121 and performs a transformation according to a transformation approach. The transformation in an embodiment may be represented as:

$$W = \text{Integer\_DCT}(X) \quad \text{Equation (0)}$$

wherein W represents the transformed output and X represents original image block.

Transformation block 330 receives a predicted image block for the same (current) original image block received on path 121, and performs the same transformation. The transformation approach is designed to have distributive properties noted above.

Subtraction block 320 subtracts the respective data values received on paths 312 and 332, and provides the results on path 325. Quntisation block 350 quantises the data received on path 325.

Prediction block 340 generates a predicted image block corresponding to an original image block based on previously reconstructed image blocks. Various well known approaches can be employed for such a prediction. However, by choosing prediction approach to minimize the number of different values, resource requirements can be reduced, as described below with examples.

5. Mean/DC Prediction Mode

Figure 4A:
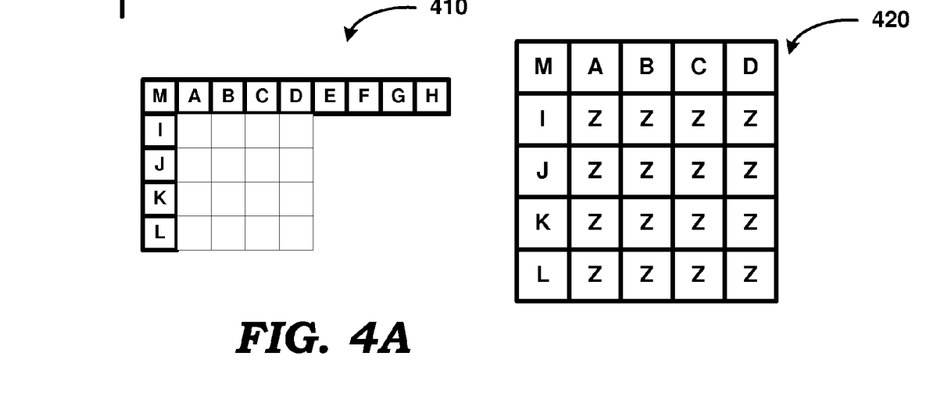
FIG. 4 is a diagram illustrating the manner in which mean prediction mode is used to predict data in an embodiment.

FIG. 4 illustrates mean prediction mode in an embodiment. The pixel values A-H, M and I-L of 410 are assumed to be available from previously reconstructed image blocks. These values are deemed to correspond to adjacent positions of the 4×4 block (of pixels) sought to be processed in the present iteration. Prediction Block 340 generates the predicted image block according to the following scheme. Prediction Block 340 computes a single value (Z) according to the below equation:

$$Z = \text{mean}(A \text{ to } D \text{ and } I \text{ to } L) \quad \text{Equation (1A)}$$

As a result, a single value can be generated and stored (instead of computing 16 values and storing entries).

To appreciate the reduction in resource requirements, it is now assumed that an integer discrete cosine transform (DCT) is used as the transformation approach in transformation blocks 310 and 330. DCT is described in further detail in documents/books entitled, "H.264 and MPEG-4 Video Compression, Ian Richardson, John Wiley & Sons, September 2003", and "ITU-T, Series H: AUDIOVISUAL AND MULTIMEDIA SYSTEMS—Advanced video coding for generic audiovisual services, March, 2005".

As is well known, the output data of DCT expressly represents variations in the input data. As the predicted image data is designed to have few different values (predicted values), the DCT transformation on the predicted image block is obtained by multiplying each predicted value with a scale factor. For example, the DCT of 4×4 data of 420, may be represented as (Z*16) in the first location (0, 0) and the remaining locations may be set to equal 0, wherein Z represents the predicted value for mean prediction and 16 represents a scale factor. Scale factors for other prediction modes are noted in the sections below.

DCT also has the distributive property noted above. Accordingly the value in the first location may be represented as:

Transformed Prediction matrix
$$[0,0] = DC\_Prediction\_Value * Scale\_factor1 \quad \text{Equation (1B)}$$

wherein the Scale_factor1 represents a constant determined based on the size of the block (as per standard). Determination of Scale_factor1 may also be based on transform and coding standard.

Therefore, transformation block 330 computes a single element that is indexed at [0, 0] location in the Transformed Prediction Matrix. The Transformed Prediction Matrix is computed according to Equation 1B, and DC_Prediction_Value is set to equal to Z. The value Z is provided by the prediction block 340.

Thus, subtraction block 320 may merely need to perform one subtraction corresponding to the (0, 0) locations of data received on paths 312 and 332. In addition, the value to be subtracted (of path 332) can be represented as a single number, thereby reducing the memory requirements. Further, prediction block 340 simply needs to compute the mean of the adjacent pixels (A-D and I-L), which may otherwise also be required. Furthermore, transformation block 330 needs to simply multiply the computed mean of the adjacent pixels (A-D and I-L) with Scale_factor1. In general, subtractor operation may be represented as:

$$Tres\_Block[0][0] = O[0][0] - DC\_Prediction\_Value * Scale\_factor1 \quad \text{Equation (1C)}$$

wherein O represents the transformed original block received on path 312.

Accordingly, in comparison with FIG. 2, subtraction block (error block) 320 may need to perform only a single subtraction, while subtractor 220 may need to perform 16 subtractions (assuming a 4×4 block), thereby reducing the computational/power requirements. In addition, as the predicted information is represented as a single value, the memory requirements also may be reduced.

It should be appreciated that alternative prediction approaches may also be employed, which require adaptation of the above embodiments for obtaining full benefit of the resource requirements reduction, as illustrated with another example below.

In an embodiment described below, horizontal or vertical prediction is used based on an observation that DCT of a matrix (two dimensional data) is separable into DCT of rows (horizontal DCT) followed by DCT of columns (vertical DCT). However, the DCT is also separable as vertical DCT followed by horizontal DCT.

6. Horizontal/Vertical Prediction Modes

Figure 5:
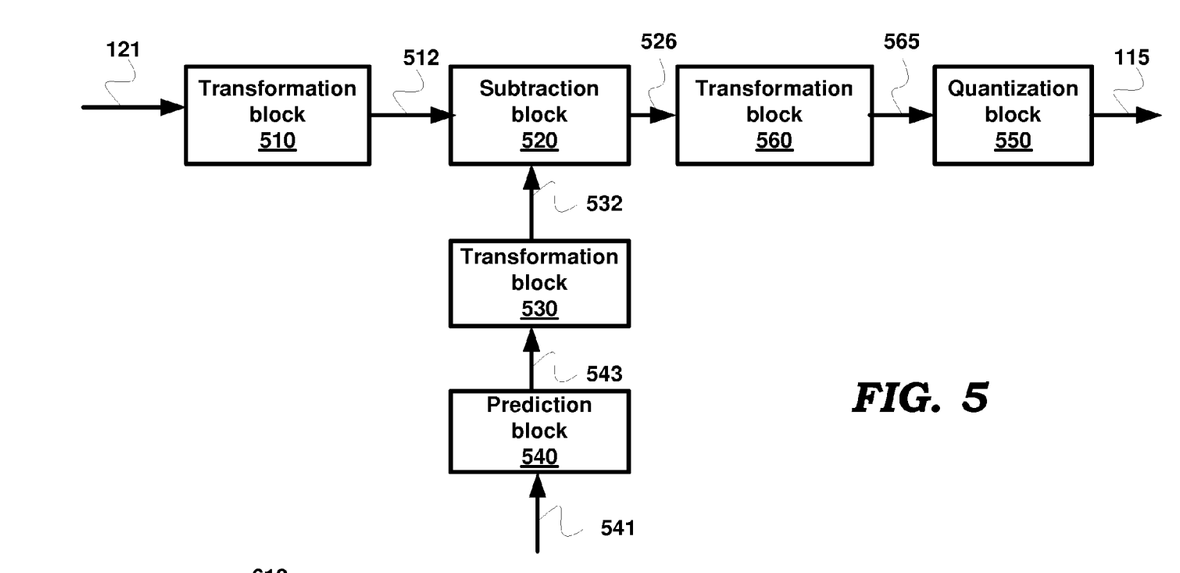
FIG. 5 is a block diagram illustrating an encoding approach in an alternative embodiment of the present invention.
Figure 6A:
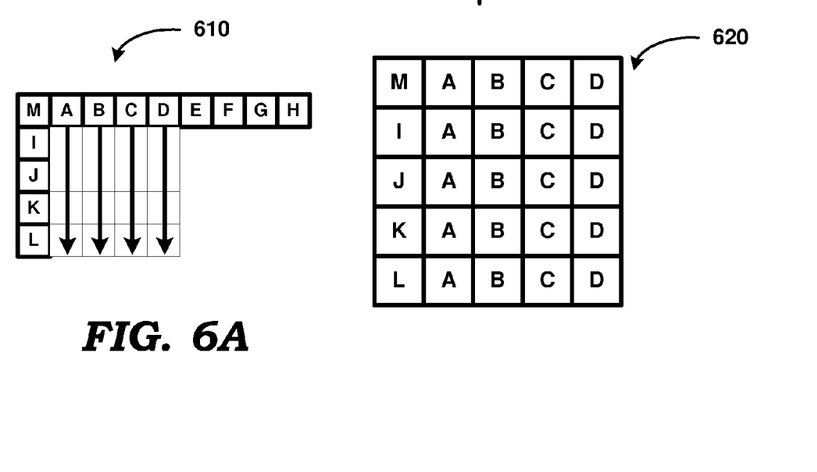
FIG. 6 is a diagram illustrating the manner in which vertical prediction mode is used to predict data in an embodiment.
Figure 6B:
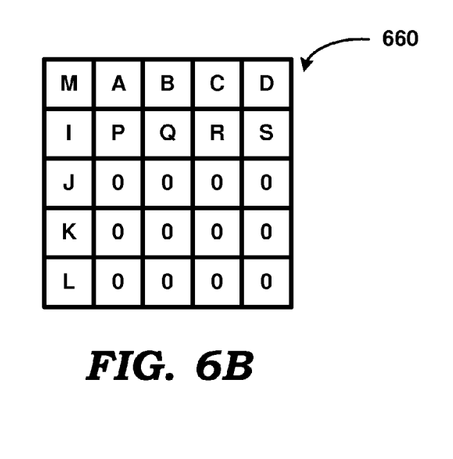

FIG. 5 is a block diagram illustrating the encoding approach in case of horizontal or vertical prediction mode. For illustration, vertical prediction is depicted in FIG. 6. As may be seen there at 610, pixels A-H and I-L are from previous reconstructed image blocks, similar to the description of FIG. 4A above.

The encoder of FIG. 5 is shown containing transformation blocks 510, 530 and 560, subtraction block 520, prediction block 540, and quantization block 550. Each block is described below in further detail.

Prediction block 540 may copy A-D into an array of 4 elements.

Transformation block 530 may also perform integer DCT (or DCT) for each column of predicted 4×4 pixels. As a result, the first row of the matrix received on path 532 would have different values (P, Q, R, S) at respective location {(0,0),(0,1), (0,2), (0,3))} and the remaining elements would have 0. Hence, transformation block 530 may only need to compute the first row of the transformed prediction matrix, i.e., P, Q, R, and S as follows.

P, Q, R and S may be represented as:

$$P = Vertical\_DC\_Prediction\_Value[0] * Scale\ factor2 \quad \text{Equation (2)}$$

$$Q = Vertical\_DC\_Prediction\_Value[1] * Scale\ factor2 \quad \text{Equation (3)}$$

$$R = Vertical\_DC\_Prediction\_Value[2] * Scale\ factor2 \quad \text{Equation (4)}$$

$$S = Vertical\_DC\_Prediction\_Value[3] * Scale\ factor2 \quad \text{Equation (5)}$$

wherein Scale factor2 is determined based on the block size and/or transform and/or standard.

In one embodiment, the value of Scale factor2 for H.264 Intra 4×4 Vertical Prediction mode is set to 4. Scale factor for other modes (supported in standard H.264) is indicated below:

Luminance Intra 4×4 DC Prediction (Mean) Mode=16,

Luminance Intra 16×16 DC Prediction (Mean) Mode=256,

Luminance Intra 8×8 DC Prediction (Mean) Mode=64,

Chrominance Intra 8×8 DC Prediction (Mean) Mode=16,

Luminance/Chrominance Intra 4×4/16×16 Horizontal/Vertical Prediction Mode=4,

Luminance Intra 8×8 Horizontal Prediction Mode=8.

Transformation block 510 may also perform only transformation of columns (vertical) only (half transformation) according to the DCT approach noted above. Output of the vertical transformation may be represented as Y.

Subtraction block 520 performs only 4 subtractions corresponding to the four locations of the first row as noted above. The subtraction operation may be represented as:

$$Y[0][0] = Y[0][0] - P \quad \text{Equation (6)}$$

$$Y[0][1] = Y[0][1] - Q \quad \text{Equation (7)}$$

$$Y[0][2] = Y[0][2] - R \quad \text{Equation (8)}$$

$$Y[0][3] = Y[0][3] - S \quad \text{Equation (9)}$$

wherein P-S are computed as shown in Equations 2-5 above.

Transformation block 560 performs horizontal transformation according to DCT approach, to complete the total transformation. Quantization block 550 may then operate similar to blocks 250, etc., as noted above.

In comparison to FIG. 2, it may be appreciated that the two transformations of 510 and 560 represent an aggregate single transformation performed in transformation block 240. Transformation block 530 may not require substantial resources since each of the values of the first row is merely multiplied by a scaling factor of 4 in the above illustrative example. It is possible to combine and execute the processing of Prediction block 540, Transformation Block 530, and Subtraction Block 520 in a single instruction of CPU, an instruction which supports the combined multiply and add/subtract operation. Hence only minimal resources may be required for the processing of Prediction block 540, Transformation Block 530, and Subtraction Block 520. As the block size processed increases, the reduction is resource requirements is correspondingly more.

While the description above is provided with respect to vertical mode, similar approach can be used for horizontal prediction mode as well. Further, the features can be extended to any block size and data type (luminance, chrominance, red, green or blue) as described below.

7. Other Prediction Modes

Even though the description is provided with respect to DC (mean) prediction mode and vertical prediction mode, the approaches may be extended to other modes as well. For example if a prediction is being generated along a particular (first) direction, the transform may also be performed along the same direction. The residual data/error can be generated efficiently by first computing the transform along first direction and then later subtracting the Scale factor*Prediction Value from the DC (that is 0 indexed coefficient) coefficient of the transformed data.

Further, the features can be extended to any block size and data type (luminance, chrominance, red, green or blue) of intra prediction modes such as Luma 16×16 Intra Mode, Luma 8×8 Intra Mode, Luma 4×4 Intra Mode and Chroma 8×8 Intra Mode allowed/defined in the standard as described below in further detail.

For example, in case of Luma 16×16 mean prediction mode, computations maybe performed using following steps.

Step 1. Split current (block to be coded) 16×16 block into 16 blocks of 4×4 size.

Step 2. Take Two Dimensional Integer DCT of each 4×4 block

Step 3. Collect the DC coefficient of each 4×4 block and form a 4×4 array of DC coefficients.

Step 4. Take Two Dimensional Hadamard Transform of 4×4 array of DC coefficients. The transformed 4×4 array of DC coefficients may be denoted as AZ_DC4.

Step 5. $Z\_DC4(0,0)=Z\_DC4(0,0)-256*Mean\_Prediction$. Wherein 256 represents the computed scaling factor 1.

Steps 1-4 may be performed by transformation block 310 and may provide Z_DC4(0,0) to subtraction block 320.

Similarly, in case of 16×16 Luminance Horizontal Prediction Mode, computation may be performed as:

Step 1. Split current (block to be coded) 16×16 block into 16 blocks of 4×4 size.

Step 2. Take One Dimensional Integer Transform of the rows of the 4×4 block. Let transformed block be denoted as Y.

Step 3. $Y(0,0)=Y(0,0)-4*HorizontalPredictionArray(0)$ $Y(1,0)=Y(1,0)-4*HorizontalPredictionArray(1)$ $Y(2,0)=Y(2,0)-4*HorizontalPredictionArray(2)$ $Y(3,0)=Y(3,0)-4*HorizontalPredictionArray(3)$ Step 4. Take One Dimensional Integer Transform of the columns of the 4×4 block. Lets denote the transformed block by Z.

Step 5. Collect the DC coefficient of each 4×4 block and form a 4×4 array of DC coefficients.

Step 6. Take Two Dimensional Hadamard Transform of this 4×4 array of DC coefficients.

Steps 1 and 2 may be performed by transformation block 510. Subtraction in Step 3 is performed by subtraction block 520, multiplication of Horizontal Prediction Array by a scale factor is performed by transformation block 530 and step 4-6 are performed by transformation block 560.

Thus, from the above, it may be appreciated that various prediction approaches can be employed to reduce the resource requirements. The features may need to be extended and/or modified depending on the specific transformation approach. The encoding described above, and the corresponding decoding is described below with an example.

8. Decoding In Mean/DC Prediction Mode

Figure 7A:
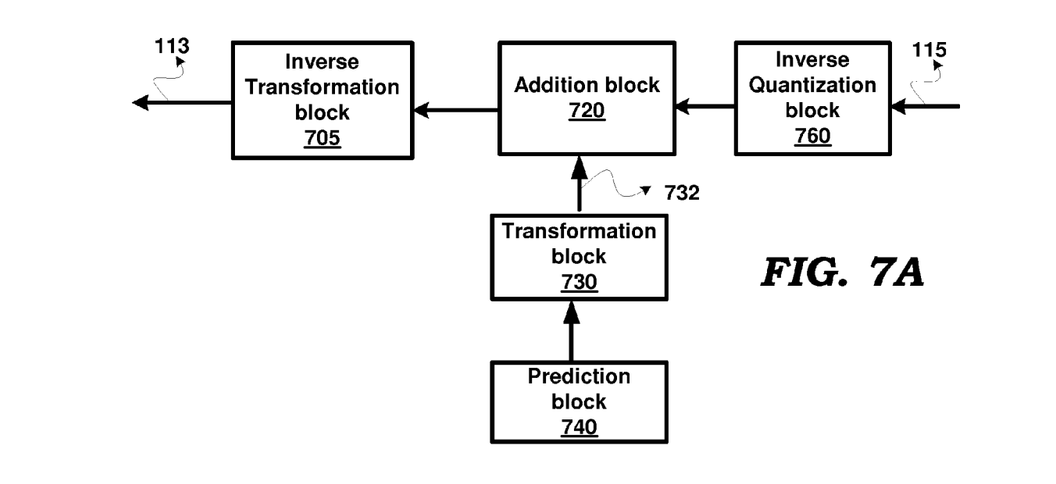
FIG. 7A is a block diagram illustrating the decoding of data in an embodiment of the present invention.

FIG. 7A is a block diagram illustrating a decoding approach in an embodiment of the present invention. The block diagram is shown containing transformation block 730, inverse transformation block 705, addition block 720, prediction block 740, and inverse quantization block 760. Each block is described below in further detail.

Prediction block 740 operates as described above with respect to transformation block 340 in FIG. 5. Transformation block 730 operates in a similar way as described above with respect to transformation block 330 in FIG. 3, except for scale factor being different. Scale factor is determined based on a block size, inverse transformation and video coding standard. As a result of the operation of prediction block 740 and transformation block 730, only the element at location $\{(0, 0)\}$ of the matrix received on path 732 may have non-zero value and the remaining elements would have 0.

Inverse quantization block 760 restores the number of bits (within an acceptable error) in the (individual elements of) compressed block to that which existed prior to quantization, for example in quantization block 350 of FIG. 3.

Addition block 720 adds the predicted values received on path 732 to the inverse quantized values. The addition block 720 performs only one addition corresponding to the $\{(0,0)\}$ location of the matrix as noted above.

Inverse transformation block 705 performs two dimensional inverse transformation according to inverse DCT approach. Inverse transformation block 705 performs the inverse operation corresponding to transformation block 310 described above and may be implemented same as the inverse transformation performed in block 270.

As described above, transformation block 730 may not require substantial resources since only one value of the matrix at location $\{(0,0)\}$ is merely copied and multiplied by a scaling factor of 64 in the above illustrative example. As the block size processed increases, the reduction in resource requirements is correspondingly more.

9. Decoding Using Horizontal/Vertical Prediction Modes

Figure 7B:
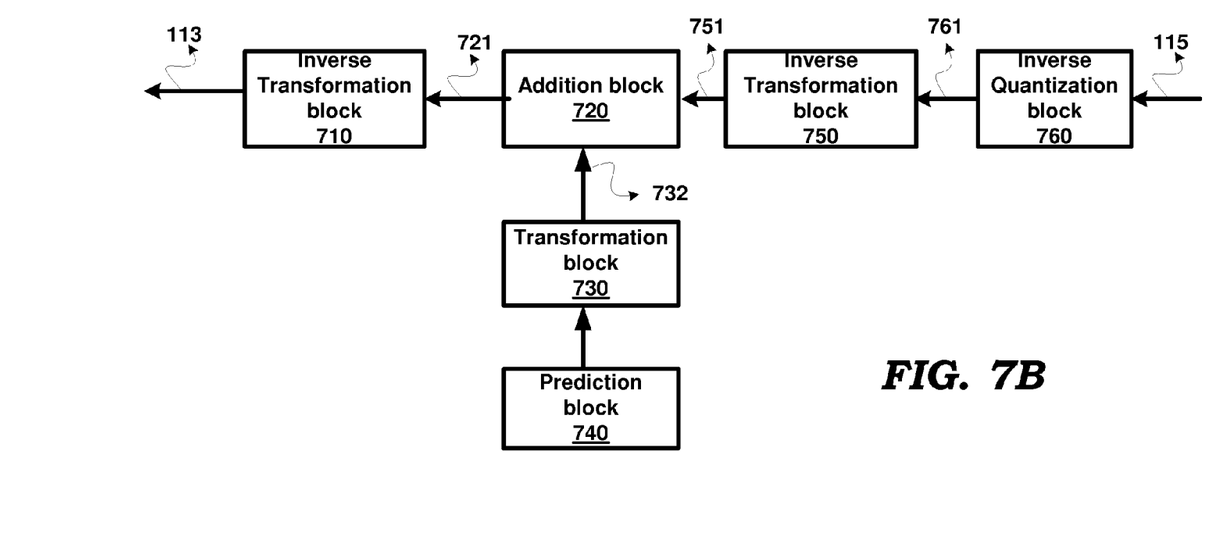
FIG. 7B is a block diagram illustrating the decoding of data in an alternative embodiment of the present invention.

FIG. 7B is a block diagram illustrating a decoding approach in an alternative embodiment of the present invention. The block diagram is shown containing transformation block 730, inverse transformation blocks 710, and 750, addition block 720, prediction block 740, and inverse quantization block 760. Each block is described below in further detail.

Prediction block 740 operates as described above with respect to block 540 in FIG. 5. Transformation block 730 operates in a similar way as described above with respect to block 530 in FIG. 5, except for scale factor being different. Scale factor is determined based on a block size, inverse transformation and video coding standard. As a result of the operation of prediction block 740 and transformation block 730, the first row of the matrix received on path 732 would have different values (A, B, C, D) at respective location {(0,0), (0,1), (0,2), (0,3))} and the remaining elements would have 0.

Inverse quantization block 760 restores the number of bits (within an acceptable error) in the (individual elements of) compressed block to that which existed prior to quantization, for example in quantization block 550 of FIG. 5.

Inverse transformation block 750 performs half of inverse transformation (horizontal) according to inverse DCT approach noted above. Addition block 720 adds the predicted values received on path 732 to the half inverse transformed data. The addition block 720 performs only four additions corresponding to the four location of the first row as noted above.

Inverse transformation block 710 performs vertical inverse transformation according to inverse DCT approach, to complete the total inverse transformation.

In comparison to FIG. 2, it may be appreciated that the two inverse transformations of 750 and 710 of FIG. 7B represent an aggregate single inverse transformation performed in block 270. As described above, transformation block 730 may not require substantial resources since each of the values of the first row is merely multiplied by a scaling factor of 64 in the above illustrative example. As the block size processed increases, the reduction in resource requirements is correspondingly more.

While the description above is provided with respect to vertical mode, similar approach can be used for horizontal prediction mode as well. In one of the embodiments for H.264 coding standard scale factor of 64 is used irrespective of prediction mode, block size (16×16, 8×8 or 4×4), or data type (luminance or chrominance). The features can be extended to other types of prediction modes also, as described above.

Features of the present invention is further described with an example with respect to FIGS. 8A-8F below.

10. EXAMPLE

Figure 8A:
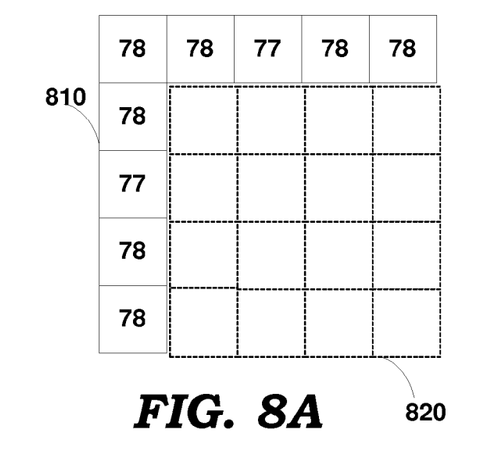
FIGS. 8A-8G together illustrate encoding with a numerical example.

With respect to FIG. 8A, portion 810 represents an example set of reconstructed values corresponding to a 4×4 image block position. Reconstructed values 810 are provided on path 541 in FIG. 5. Portion 820 represents the current image block presently being encoded in the present iteration.

Figure 8B:
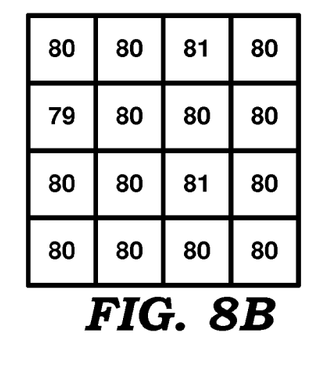
Figure 8C:
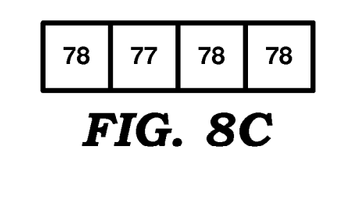

FIG. 8B represent an example set of values in a 4×4 original image block received on path 121. FIG. 8C represents an example set of predicted image block provided on path 543 corresponding to the original image block of FIG. 8B. Predicted image block is obtained by performing a vertical prediction based on the reconstructed values 810. Accordingly, horizontal values of 810 are copied. Each value represents the vertical DC prediction coefficients that are used in Equations 2-5 noted above.

Figure 8D:
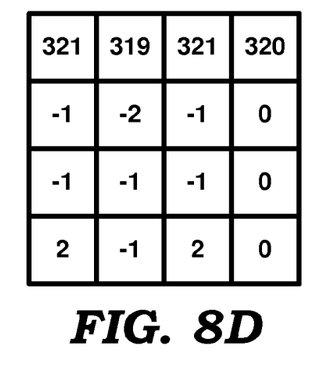
Figure 8E:
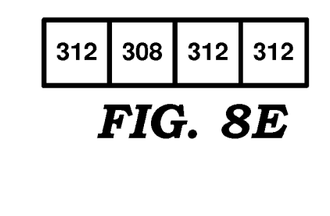

FIG. 8D represents output of transformation block 510. Transformation block 510 perform vertical integer DCT transformation on original image block of FIG. 8B. FIG. 8E represents the output of transformation block 530. Transformation block 530 computes the values in FIG. 8E according to equation 2-5 with the scale factor2 equaling 4. For example the first value 312 is obtained as 78*4, second value 308 is obtained by performing 77*4. Result of such computation represents a vertical integer DCT transformation on predicted image block.

Figure 8F:
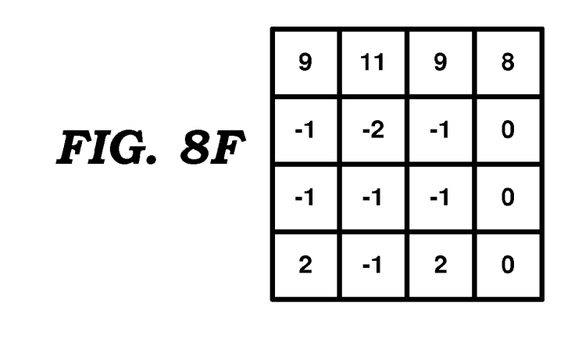

FIG. 8F represents the output of the subtraction block 520. Subtraction block 520 performs the subtraction of values of FIG. 8E with corresponding values of FIG. 8D to obtain the values of the first row of FIG. 8E. The values of the remaining rows of FIG. 8E is obtained directly from second, third and fourth rows of FIG. 8D. As a result the subtraction block 520 performs only 4 subtractions.

Figure 8G:
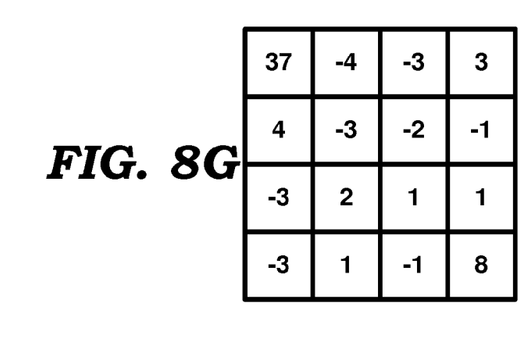

FIG. 8G represents the output of transformation block 560. Transformation block 560 performs the horizontal integer DCT transformation on the values of FIG. 8F. Quantization block 550 quantizes each value in FIG. 8G.

The decoding is performed according to FIG. 7B and is not repeated in the interest of conciseness.

It should be understood that the features described above can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing the systems with a desired mix of hardware, software and/or firmware. An embodiment implemented substantially in software is described below.

11. Software Implementation

Figure 9:
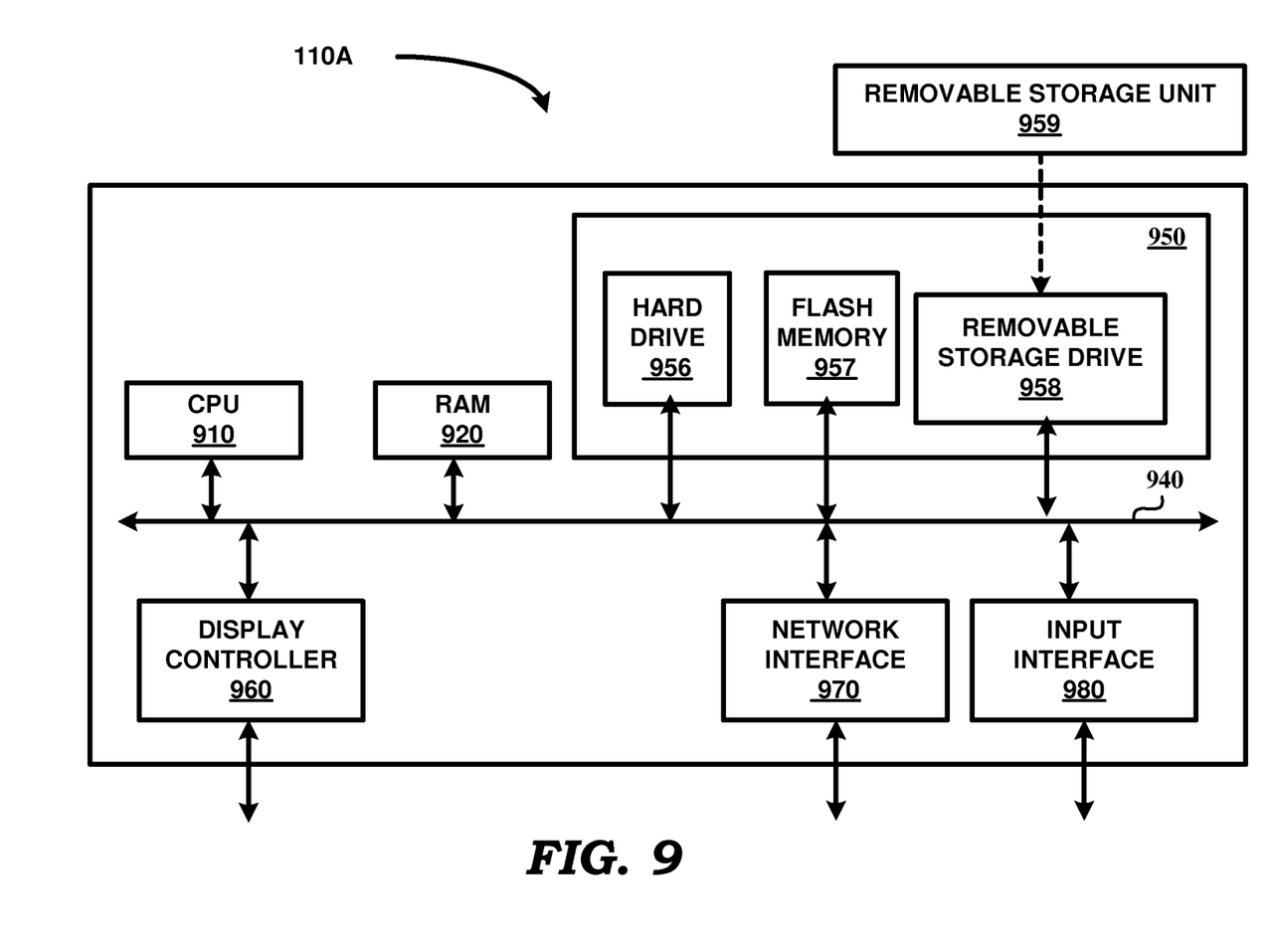
FIG. 9 is a block diagram of a digital processing system in which several features of the invention are operative upon execution of software instructions.

FIG. 9 is a block diagram illustrating the details of processing unit 110A in another embodiment. Processing unit 110A may contain one or more processors such as central processing unit (CPU) 910, random access memory (RAM) 920, secondary storage unit 950, display controller 960, network interface 970, and input interface 980. All the components may communicate with each other over communication path 940, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general purpose processing unit. RAM 920 may receive instructions from secondary storage unit 950 using communication path 940. In addition, RAM 920 may store video frames received from a video camera during the encoding and decoding operations noted above.

Display controller 960 generates display signals (e.g., in RGB format) to display unit 130A (FIG. 1) based on data/instructions received from CPU 910. Network interface 970 provides connectivity to a network (e.g., using Internet Protocol), and may be used to receive/transmit coded video/data frames. Network interface 970 may correspond to path 115 of FIG. 1. Input interface 980 may include interfaces such as keyboard/mouse, and interface for receiving video frames from video camera 120A.

Secondary storage unit 950 may contain hard drive 956, flash memory 957, and removable storage drive 958. Some or all of the data and instructions may be provided on removable storage unit 959, and the data and instructions may be read and provided by removable storage drive 958 to CPU 910. Floppy drive, magnetic tape drive, CD_ROM drive, DVD Drive, Flash memory, removable memory chip (PCMCIA Card, EPROM) are examples of such removable storage drive

958. Alternatively, data and instructions may be copied to RAM 920 from which CPU 910 may execute. Groups of software instructions (for example, in compiled/object form or post-linking in a form suitable for execution by CPU 910) are termed as code.

Removable storage unit 959 may be implemented using medium and storage format compatible with removable storage drive 958 such that removable storage drive 958 can read the data and instructions. Thus, removable storage unit 959 includes a computer readable storage medium having stored therein computer software and/or data.

In general, the computer (or generally, machine) readable medium refers to any medium from which processors can read and execute instructions. The medium can be randomly accessed (such as RAM 920 or flash memory 957), volatile, non-volatile, removable or non-removable, etc. While the computer readable medium is shown being provided from within processing unit 110A for illustration, it should be appreciated that the computer readable medium can be provided external to processing unit 110A as well.

In this document, the term "computer program product" is used to generally refer to removable storage unit 959 or hard disk installed in hard drive 956. These computer program products are means for providing software to CPU 910. CPU 910 may retrieve the software instructions, and execute the instructions to provide various features (encoding and decoding) of the present invention described above.

12. CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. An encoder for encoding a sequence of data frames, said encoder comprising:
a first transformation block receiving a first data frame contained in said sequence of data frames and generating a transformed frame according to a discrete cosine transformation approach;
a prediction block generating a predicted frame corresponding to said first data frame from data frames prior to said first data frame in said sequence using a prediction approach selected from a group consisting of a mean prediction, a horizontal prediction and a vertical prediction, wherein a reduced number of data values for each micro block of the data frames prior to said first data frame is computed;
a second transformation block generating a transformed predicted data by processing said predicted frame also according to said discrete cosine transformation approach;
a subtractor block generating a difference of said transformed predicted data and said transformed frame to generate a difference data; and
a quantization block quantizing said difference data to generate quantized data corresponding to said first data frame.

2. The encoder of claim 1, wherein said transformation approach satisfies a distributive property.

3. The encoder of claim 2, wherein said prediction approach is designed to generate fewer elements of different values compared to a number of elements in said first data frame and the different values are generated in predictable positions, wherein said transformation approach is chosen such that the output expressly represents variations in the input data.

4. The encoder of claim 3, wherein said prediction approach comprises a mean approach, and said sub tractor block performs a single subtraction only to generate said difference data.

5. The encoder of claim 4, wherein said prediction approach comprises one of horizontal prediction or vertical prediction, wherein said first transformation block performs transformation of said first data frame in one dimension, wherein the said dimension is along the direction of the prediction, said encoder further comprising a third transformation block performing transformation in another dimension of an output generated by said sub tractor block, wherein the output of said third transformation block is provided as an input to said quantization block.

6. The encoder of claim 2, wherein the said transformation transforms the predicted data by multiplying the predicted data with a scale factor, representing a single number.

7. A decoder for decoding a sequence of encoded data frames, said decoder comprising:
an inverse quantization block generating a plurality of scaled values corresponding to the digital values in a first encoded data frame contained in said sequence of encoded data frames;
a prediction block generating a predicted frame corresponding to said first encoded data frame from data frames prior to said first encoded data frame in said sequence using a prediction approach selected from the group consisting of a mean prediction, a horizontal prediction, a vertical prediction, wherein a reduced number of data values for each micro block of the data frames prior to said first encoded data is computed;
a transformation block transforming said predicted frame according to a discrete cosine transformation approach to generate a transformed frame;
an adder adding respective values of said transformed frame and said plurality of scaled values to generate an added frame; and
a first inverse transformation block performing an inverse transform of said discrete cosine transformation approach on said added frame to generate a decoded frame corresponding to said first encoded data frame.

8. The decoder of claim 7, further comprising:
a second inverse transformation block located between said inverse quantization block and said adder, and performing a partial inverse transformation of said plurality of scaled values to generate a partially transformed frame, wherein said adder adds said plurality of scaled values in partially transformed form,
wherein said first inverse transformation block also completes said partial inverse transformation.

9. The decoder of claim 8, wherein said prediction approach is designed to generate fewer elements of different values compared to a number of elements in said first encoded data frame and the different values are generated in predictable positions, wherein said transformation approach is chosen such that the output expressly represents variations in the input data.

10. The decoder of claim 9, wherein said prediction approach comprises a mean approach, and said adder performs a single addition.

11. The decoder of claim 7, wherein said transformation approach satisfies a distributive property.

12. A method of processing a plurality of data frames, said method comprising:
  receiving a first data frame contained in a sequence of data frames and generating a transformed frame according to a discrete cosine transformation approach, wherein said sequence of data frames are contained in said plurality of data frames;
  generating a predicted frame corresponding to said first data frame from data frames prior to said first data frame in said sequence using a prediction approach selected from a group consisting of a mean prediction, a horizontal prediction and a vertical prediction, wherein a reduced number of data values for each micro block of the data frames prior to said first data frame is computed;
  generating a transformed predicted data by processing said predicted frame also according to said discrete cosine transformation approach;
  generating a difference of said transformed predicted data and said transformed frame to generate a difference data; and
  quantizing said difference data to generate quantized data corresponding to said first data frame.

13. The method of claim 12, wherein said transformation approach satisfies a distributive property.

14. The method of claim 13, wherein said prediction approach is designed to generate fewer elements of different values compared to a number of elements in said first data frame and the different values are generated in predictable positions, wherein said transformation approach is chosen such that the output expressly represents variations in the input data.

15. The method of claim 12, wherein said prediction approach comprises one of horizontal prediction or vertical prediction, wherein said first data frame is transformed first in one dimension, wherein the said dimension is along the direction of the prediction, said method further comprising performing transformation in another dimension of said difference data.

16. The method of claim 12, further comprising;
  receiving a second data frame in an encoded format, wherein said second data frame is contained in a second sequence of frames comprised in said plurality of data frames;
  generating a plurality of scaled values corresponding to the digital values in said second data frame;
  generating a second predicted frame corresponding to said second data frame from data frames prior to said second data frame in said second sequence of frames using a second prediction approach selected from the group consisting of a mean prediction, a horizontal prediction, a vertical prediction, wherein a reduced number of data values for each micro block of the data frames prior to said first encoded data is computed;
  generating a transformed second predicted data by processing said second predicted data also according to said discrete cosine transformation approach;
  adding respective values of said transformed second frame and said plurality of scaled values to generate an added frame; and
  performing an inverse transform of said discrete cosine transformation approach on said added frame to generate a decoded frame corresponding to said second encoded data frame.

17. A non-transitory machine readable medium carrying one or more sequences of instructions for causing a system to process a plurality of data frames, wherein execution of said one or more sequences of instructions by one or more processors contained in said system causes said system to perform the actions of:
  receiving a first data frame contained in a sequence of data frames and generating a transformed frame according to a discrete cosine transformation approach, wherein said sequence of data frames are contained in said plurality of data frames;
  generating a predicted frame corresponding to said first data frame from data frames prior to said first data frame in said sequence using a prediction approach, wherein a reduced number of data values for each micro block of the data frames prior to said first data frame is computed;
  generating a transformed predicted data by processing said predicted frame also according to said discrete cosine transformation approach;
  generating a difference of said transformed predicted data and said transformed frame to generate a difference data; and
  quantizing said difference data to generate quantized data corresponding to said first data frame.

18. The non-transitory machine readable medium of claim 17, wherein said transformation approach satisfies a distributive property.

19. The non-transitory machine readable medium of claim 18, further comprising:
  receiving a second data frame in an encoded format, wherein said second data frame is contained in a second sequence of frames comprised in said plurality of data frames;
  generating a plurality of scaled values corresponding to the digital values in said second data frame;
  generating a second predicted frame corresponding to said second data frame from data frames prior to said second data frame in said second sequence using a second prediction approach, wherein a reduced number of data values for each micro block of the data frames prior to said first encoded data is computed;
  generating a transformed second predicted data by processing said second predicted frame also according to said discrete cosine transformation approach;
  adding respective values of said transformed second predicted data and said plurality of scaled values to generate an added frame; and
  performing an inverse transform of said discrete cosine transformation approach on said added frame to generate a decoded frame corresponding to said second encoded data frame.

20. The non-transitory machine readable medium of claim 17, wherein generating said predicted frame, generating said transformed predicted data and generating said difference is performed by a single instruction.

* * * * *